March 28, 1961 C. E. KEENE 2,977,480

SHAFT ROTATION TO TIME INTERVAL TRANSDUCER

Filed Dec. 15, 1959 2 Sheets-Sheet 1

INVENTOR.
CARL E. KEENE
BY Wade Koontz
ATTORNEY
and
James S. Shannon
AGENT

March 28, 1961 C. E. KEENE 2,977,480

SHAFT ROTATION TO TIME INTERVAL TRANSDUCER

Filed Dec. 15, 1959 2 Sheets-Sheet 2

INVENTOR.
CARL E. KEENE
BY Wade Koontz
ATTORNEY
and
James S. Shannon
AGENT

United States Patent Office 2,977,480

Patented Mar. 28, 1961

2,977,480

SHAFT ROTATION TO TIME INTERVAL TRANSDUCER

Carl E. Keene, 13809 E. Ave., G–8, Lancaster, Calif.

Filed Dec. 15, 1959, Ser. No. 859,822

3 Claims. (Cl. 250—220)

(Granted under Title 35, U.S. Code (1952), sec. 266)

The invention described herein may be manufactured and used by or for the United States Government for governmental purposes without payment to me of any royalty thereon.

The purpose of this invention is to provide a transducer or pick-off for converting a shaft rotation into a proportionate time interval represented as the elapsed time between two successive electrical pulses or, in another embodiment, as the duration of an electrical pulse.

Figures 1, 5:
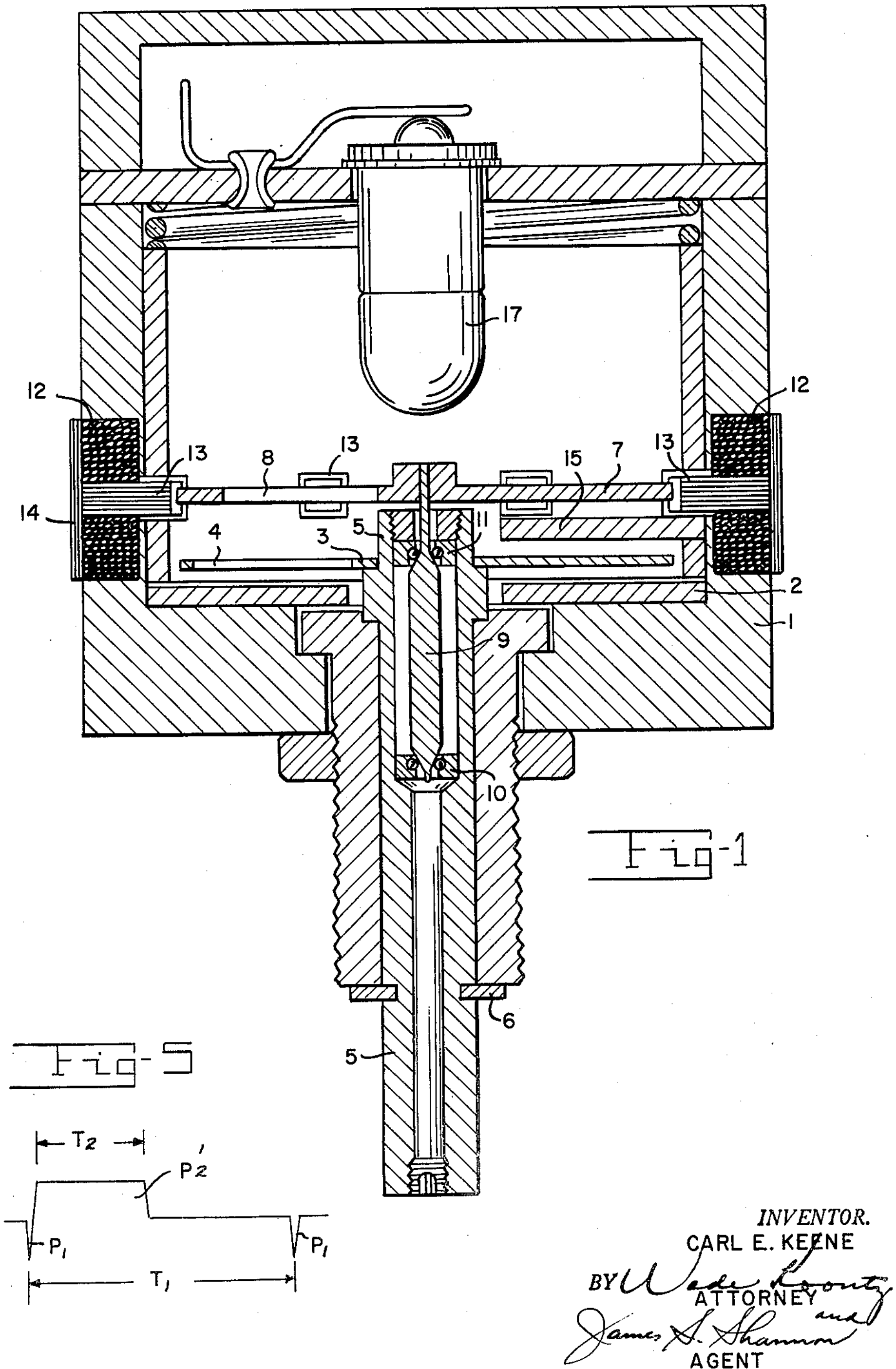
Figure 4:
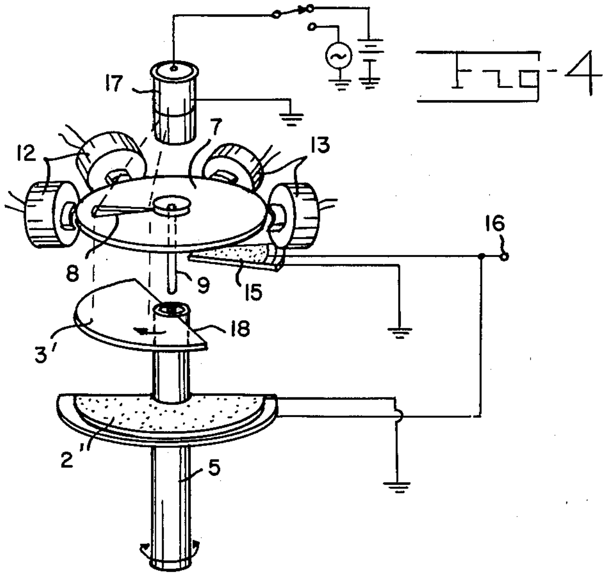
Figure 3:
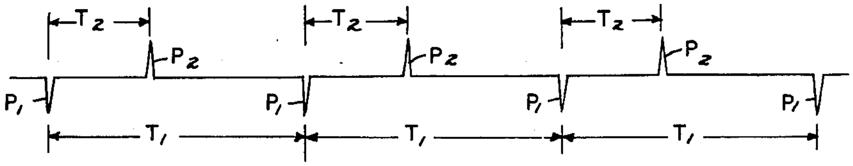
Figure 2:
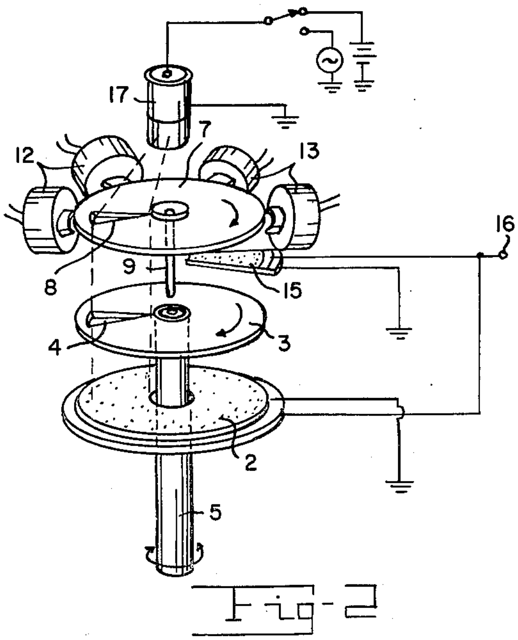

The invention will be explained in detail with reference to the specific embodiments thereof shown in the accompanying drawings in which Fig. 1 is a cross section of a transducer in accordance with the invention, Fig. 2 is an exploded view of the essential elements of Fig. 1, Fig. 3 shows the waveform produced by the apparatus of Fig. 1, Fig. 4 is an exploded view of an embodiment of the invention in which the time interval is represented as the duration of an electrical pulse, and Fig. 5 shows the waveform produced by the apparatus of Fig. 4.

Referring to Figs. 1 and 2, the cylindrical housing 1 contains at its bottom a disc shaped self-generating photoelectric cell 2, for example, a selenium photoelectric cell. Situated above photocell 2 is an opaque disc 3, preferably of metal, having a small sectorial opening 4 of, for example, three degrees. Disc 3 is mounted on shaft 5, which extends through and is supported by housing 1, being retained by snap ring 6. Disc 3 should be situated as near the upper surface of photocell 2 as is practical.

Situated above disc 3 is a second opaque disc 7 having a sectorial opening 8 of the same size as opening 4. Disc 7 is carried by a shaft 9, which is rotatably mounted inside shaft 5 by means of anti-friction bearings 10 and 11. Also, disc 7 is made of a magnetic material which is permanently magnetized and which acts as the rotor of a synchronous motor for which coils 12, pole pieces 13 and magnetic ring 14 form the field. In this manner disc 7 is driven at a constant speed in synchronism with the alternating current energizing the field.

A second photoelectric cell 15 of the same type as photocell 2, having the same sectorial shape as openings 4 and having approximately the same size as these openings is positioned between discs 7 and 3 with its sensitive surface facing disc 7. Suitable leads (not shown in Fig. 1) extend from photocells 2 and 15 to output terminal 16. Situated above the center of disc 7 is a light source 17 such as a small incandescent or neon lamp.

In using the apparatus of Figs. 1–2, the input shaft rotation is applied in any suitable manner to shaft 5 and thence to disc 3. The zero position of shaft 5 and disc 3 is the position at which the opening 4 is directly beneath photocell 15. With shaft 5 in its zero position and disc 7 rotating at constant speed, a negative pulse is produced at terminal 16 each time opening 8 passes across and admits light to photocell 15. The result is a series of negative pulses $P_1$ separated by equal time intervals $T_1$, this interval being the rotational period of disc 7. This is illustrated in Fig. 3. The pulses $P_1$ are negative because the negative terminal of photocell 15 is connected to output terminal 16.

If shaft 5 is now rotated from its zero position in the same direction as the rotation of disc 7, opening 4 of disc 3 passes from beneath photocell 12 so that whenever opening 8 of disc 7 passes over opening 4 light from source 17 is admitted to photocell 2 through these two openings. This produces a positive pulse $P_2$ (Fig. 3) at output terminal 16 since photocell 2 has its positive terminal connected to the output terminal. The interval $T_2$ between $P_1$ and $P_2$ is proportional to the amount of rotation of shaft 5 away from its zero position.

It is sometimes desired that the output be in the form of a pulse, the duration of which is proportional to the rotation of the input shaft away from its zero position. Fig. 4 shows a modification of the invention designed to produce this kind of output. In this embodiment, disc 3 is replaced by a semicircular opaque plate $3^1$. Further, photocell 2 is restricted to 180°, as shown at $2^1$, and has one edge beneath photocell 15. Shaft 5 is in its zero position when the trailing edge 18 of plate $3^1$ is situated beneath photocell 15. When shaft 5 is rotated from its zero position in the direction of rotation of disc 7, edge 18 moves from beneath photocell 15 exposing a sector of photocell $2^1$ equal in angular extent to the rotation of shaft 5. As opening 8 in the disc 7 sweeps over this exposed sector a positive pulse $P_{2'}$ (Fig. 5) is produced at terminal 16 the duration $T_2$ of which is proportional to the shaft 5 rotation.

The shaft 5 rotation is equal to 360° $T_2/T_1$ and consequently the accuracy of the output signal as a measure of the input shaft rotation is independent of the speed of disc 7, since a change in this spud will affect $T_2$ and $T_1$ by equal factors. The accuracy of the shaft rotation measurement as well as the smallest and largest input rotations that can be measured are dependent upon the angular widths of openings 4 and 8 and photocell 15, these factors improving as these openings and the photocell are made narrower.

The light source 17 may be energized with either direct or alternating current, in the latter case using a gaseous discharge source such as a neon lamp. When alternating current is used the output pulses are made up of alternating currents of the same frequency. This method may be useful when it is desired to transmit the outputs of several transducers over a single channel, since the use of different frequencies permits the outputs to be separated by filtering at the receiving end. Selenium photoelectric cells will respond to frequencies as high as 10 kc./s.

The transducer may be used as a pick-off with any device capable of turning the disc 3. For example, it may be used to transmit the position of the gimbal of a gyroscope, the position of a vane used to determine the direction of fluid flow, or the position of a meter movement. For sensitive devices producing low driving torque such as electric meters, the mass of disc 3 may be reduced by making it of thin metal foil and the shaft 5 may be lightened and suspended in anti-friction bearings such as ball bearings or jewels. In such cases it may be advisable to support shaft 9 and disc 7 from the body of the instrument rather than from shaft 5 as in Fig. 1.

I claim:

1. A shaft rotation to time interval transducer comprising: a first photoelectric cell having a plane sensitive surface; an opaque disc having a narrow radial opening rotatably mounted parallel to the sensitive surface of said first photoelectric cell and concentric with respect to an axis normal to said sensitive surface; a second photoelectric cell fixed relative to said first photoelectric cell and situated between said disc and said first photoelectric cell, said second cell being a narrow element paralleling a radius of said opaque disc; a flat masking element rotatably mounted relative to said first photoelectric cell and concentric with respect to said axis, said masking element being situated between said second and first photoelectric cells and having an effective angular extent about said axis of less than 360°; a source of light on the opposite side of said opaque disc from said second photoelectric cell; means for rotating said opaque disc at constant speed; means for connecting said photoelectric cells to a common output circuit; and means for applying a rotational input to said masking element.

2. A shaft rotation to time interval transducer comprising: a disc-shaped first photoelectric cell; a first opaque disc having a narrow radial opening rotatably mounted directly above, parallel to and concentric with said first photoelectric cell; a second photoelectric cell fixed relative to said first cell and positioned close to said first disc and on the opposite side thereof from said first cell, said second cell being narrow and extending substantially parallel to a radius of said first disc; a second opaque disc, having a narrow radial opening, rotatably mounted concentrically with and parallel to said first disc and on the opposite side of said second cell from said first disc; a source of light located on the opposite side of said second disc from said second photoelectric cell and positioned to send light through the opening of said second disc to said second cell when the said opening is in register with said second cell, and to send light through the openings in said second and first discs and to said first photoelectric cell when the opening in said second disc is in register with the opening in said first disc; means for rotating said second disc at constant speed; means for applying a rotational input to said first disc; and means for connecting said photoelectric cells to a common output circuit.

3. A shaft rotation to time interval transducer comprising: a first photoelectric cell having a plane semicircular sensitive surface; an opaque disc having a narrow radial opening rotatably mounted parallel to said sensitive surface and concentric therewith; a second photoelectric cell fixed relative to said first photoelectric cell and situated between said disc and said first photoelectric cell, said second cell being a narrow element paralleling a radius of said opaque disc; a thin, flat, semi-circular masking element rotatably mounted parallel to said first photoelectric cell and concentric with respect thereto, said masking element being situated between said first and second photoelectric cells; a source of light on the opposite side of said opaque disc from said second photoelectric cell; means for rotating said opaque disc at constant speed; means for connecting said photoelectric cells to a common output circuit; and means for applying a rotational input to said masking element.

References Cited in the file of this patent

UNITED STATES PATENTS

| | | |
|---|---|---|
| 2,543,021 | Hoffmann et al. | Feb. 27, 1951 |
| 2,718,608 | Laws | Sept. 20, 1955 |
| 2,796,598 | Cartwright | June 18, 1957 |
| 2,808,518 | Koonz | Oct. 1, 1957 |